United States Patent
Ng et al.

(10) Patent No.: US 8,634,560 B1
(45) Date of Patent: Jan. 21, 2014

(54) TIME-BASED SECURE KEY SYNCHRONIZATION

(75) Inventors: Anthony Ng, Cupertino, CA (US); Chih-Wei Chao, Saratogo, CA (US); Suresh Melam, Santa Clara, CA (US); I-Wen Michelle Hsiung, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 579 days.

(21) Appl. No.: 12/879,570

(22) Filed: Sep. 10, 2010

(51) Int. Cl.
*H04K 1/00* (2006.01)
*H04L 9/08* (2006.01)

(52) U.S. Cl.
USPC .......................... 380/273; 380/274; 380/279

(58) Field of Classification Search
None
See application file for complete search history.

(56) References Cited

U.S. PATENT DOCUMENTS

| 6,295,361 B1* | 9/2001 | Kadansky et al. | 380/278 |
| 7,234,063 B1* | 6/2007 | Baugher et al. | 713/189 |
| 7,787,494 B1* | 8/2010 | Aubin et al. | 370/468 |
| 2004/0105549 A1* | 6/2004 | Suzuki et al. | 380/278 |
| 2008/0080713 A1* | 4/2008 | Cho et al. | 380/273 |
| 2011/0010591 A1* | 1/2011 | Damola et al. | 714/57 |

OTHER PUBLICATIONS

Niazi et. al., Group Encrypted Transport VPN (Get VPN) Design and Implementation Guide, Feb. 2010, pp. 1-10.*

* cited by examiner

*Primary Examiner* — Philip Chea
*Assistant Examiner* — Trong Nguyen
(74) *Attorney, Agent, or Firm* — Harrity & Harrity, LLP

(57) ABSTRACT

A server device initiates a traffic encapsulation key (TEK) re-key sequence for a group virtual private network (VPN), based on an upcoming expiration time for an existing TEK. The server device sends, via a push message during a first time period immediately after the initiating, a new TEK to members of the group VPN. The server device receives, during a second time period that immediately follows the first time period, a pull request, for the new TEK, from one of the members of the group VPN, and sends, to the one of the members, the new TEK, where the re-key sequence transitions all the members of the group VPN from the existing TEK key to the new TEK key before the expiration time for the existing TEK.

25 Claims, 12 Drawing Sheets

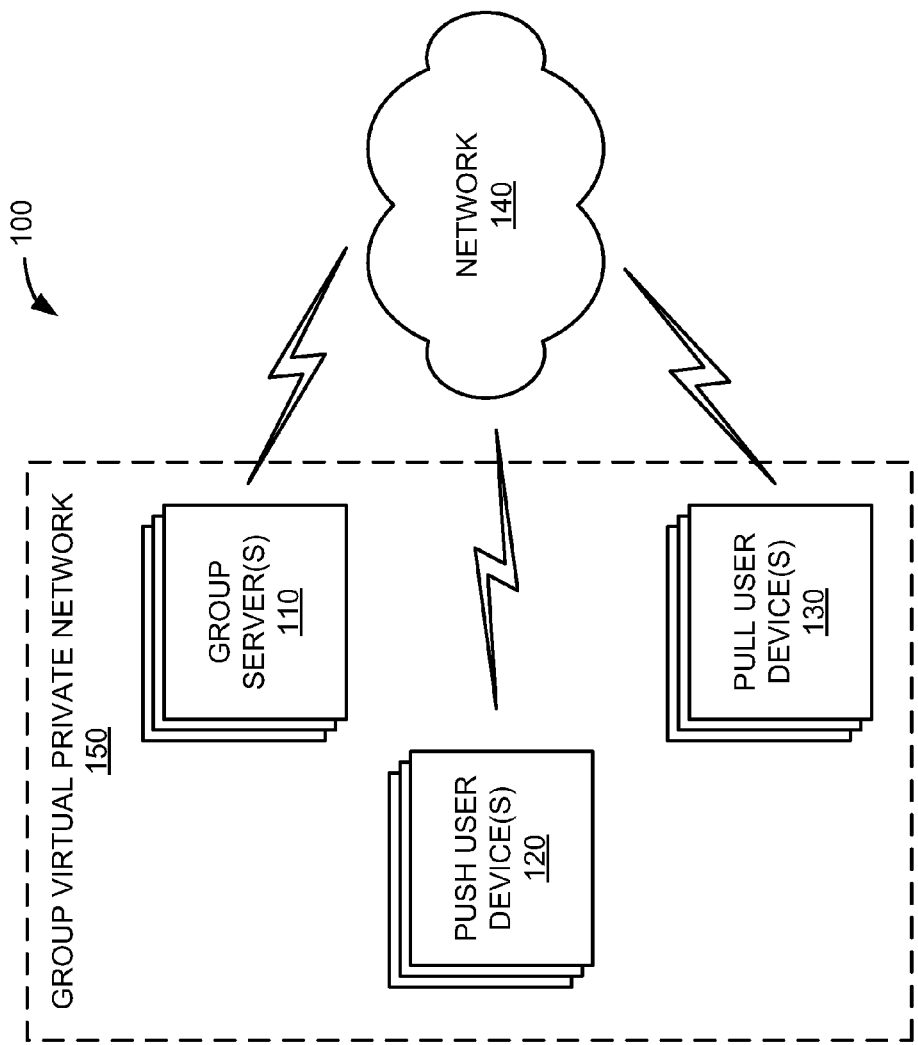

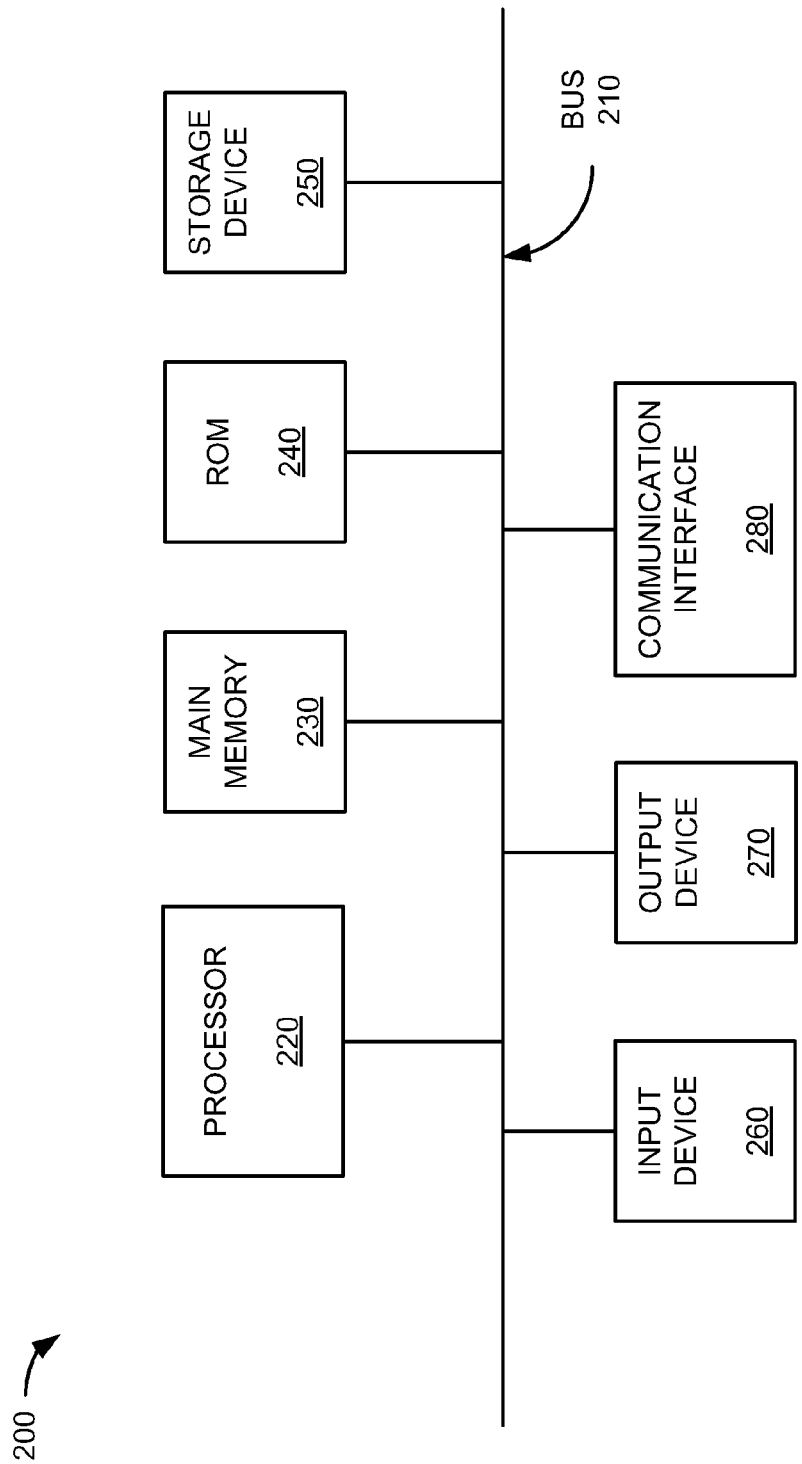

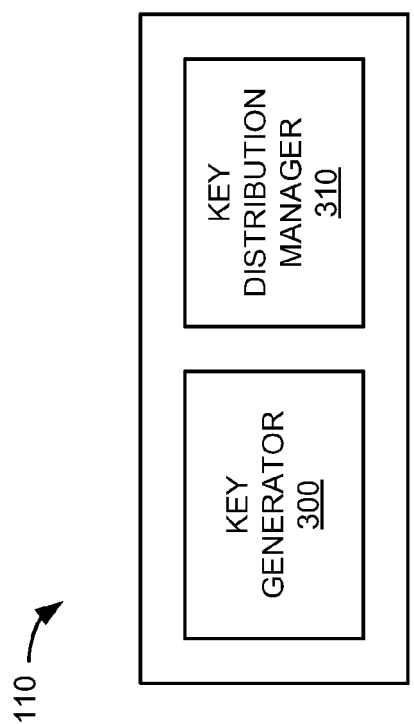

TIME-BASED SECURE KEY SYNCHRONIZATION

BACKGROUND

A typical VPN (Virtual Private Network) is a network of point-to-point tunnels, where the tunnel is a security association (SA) between two security devices. A security key for the SA is negotiated between two tunnel end devices. Tunnel encapsulation adds an outer header that hides the original source and destination IP addresses. Multicast traffic is replicated and encapsulated before entering into tunnels and treated like unicast traffic within the core network. The overlay architecture is not optimal for multicast or routing traffic, and is not scalable for large deployment.

Group VPNs have been developed that extend current Internet Protocol Security (IPsec) architecture to support group-shared SAs. The center of a group VPN includes a group server, which can be a cluster of servers.

SUMMARY

In one implementation, a method performed by a server device may include initiating, by the server device, a traffic encapsulation key (TEK) re-key sequence for a group virtual private network (VPN), based on an upcoming expiration time for an existing TEK; sending, by the server device and via a push message during a first time period T immediately after the initiating, a new TEK to members of the group VPN; receiving, by the server device and during a second time period T that immediately follows the first time period T, a pull request, for the new TEK, from one of the members of the group VPN; and sending, by the server device and to the one of the members, the new TEK, where the re-key sequence transitions all the members of the group VPN from the existing TEK key to the new TEK key before the expiration time for the existing TEK.

In another implementation, a device may include a memory to store instructions and a processor. The processor may execute instructions in the memory to: initiate a TEK re-key sequence for a group VPN, based on an upcoming expiration time for an existing TEK; send, via a multicast push message and during a first time period T after the initiating, a new TEK to member devices of the group VPN; receive, by the server device and during a second time period equal in duration to the first time period and that immediately follows an end of the first time period, a pull request, from one of the members of the group VPN, for the new TEK; and send, to the one of the members and via a point-to-point message, the new TEK, where the re-key sequence transitions all the members of the group VPN from the existing TEK to the new TEK before the expiration time for the existing TEK.

In a further implementation, a computer-readable memory having computer-executable instructions may include one or more instructions to identify a duration of time T, based on a maximum round trip time for an exchange of a message between a group server and one of a plurality of members of a group virtual private network (VPN); one or more instructions to initiate a traffic encapsulation key (TEK) re-key sequence for the group VPN, where the initiating the TEK re-key sequence occurs at a time period of (4*T) before an upcoming expiration time for the existing TEK; one or more instructions to send, via a multicast push message and during a first time period of T after the initiating, a new TEK to the plurality of members of the group VPN; one or more instructions to receive, during a second time period of T that immediately follows an end of the first time period of T, a pull request, from another one of the plurality of members of the group VPN, for the new TEK; and one or more instructions to send, based on the pull request and to the other one of the plurality of members via a point-to-point message, the new TEK, where the re-key sequence transitions all the plurality of members of the group VPN from the existing TEK to the new TEK before the expiration time for the existing TEK.

In still another implementation, a computer-readable memory having computer-executable instructions may include one or more instructions to initiate a key encapsulation key (KEK) re-key sequence for a group VPN, based on an upcoming expiration time for an existing KEK; one or more instructions to send, via a multicast push message during a time period T after initiating the KEK re-key sequence, a new KEK to members of the group VPN; one or more instructions to activate, at a time of T after sending the multicast message, the new KEK to encrypt outgoing traffic; and one or more instructions to delete, at a time of (2*T) after sending the multicast message, the old KEK.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 1A and 1B are diagrams of an example network in which concepts described herein may be implemented;

FIG. 2 is a block diagram of an example device of FIGS. 1A and/or 1B;

FIG. 3 is a block diagram of example functional components of a group server of FIGS. 1A and/or 1B;

DETAILED DESCRIPTION

Figure 1B:
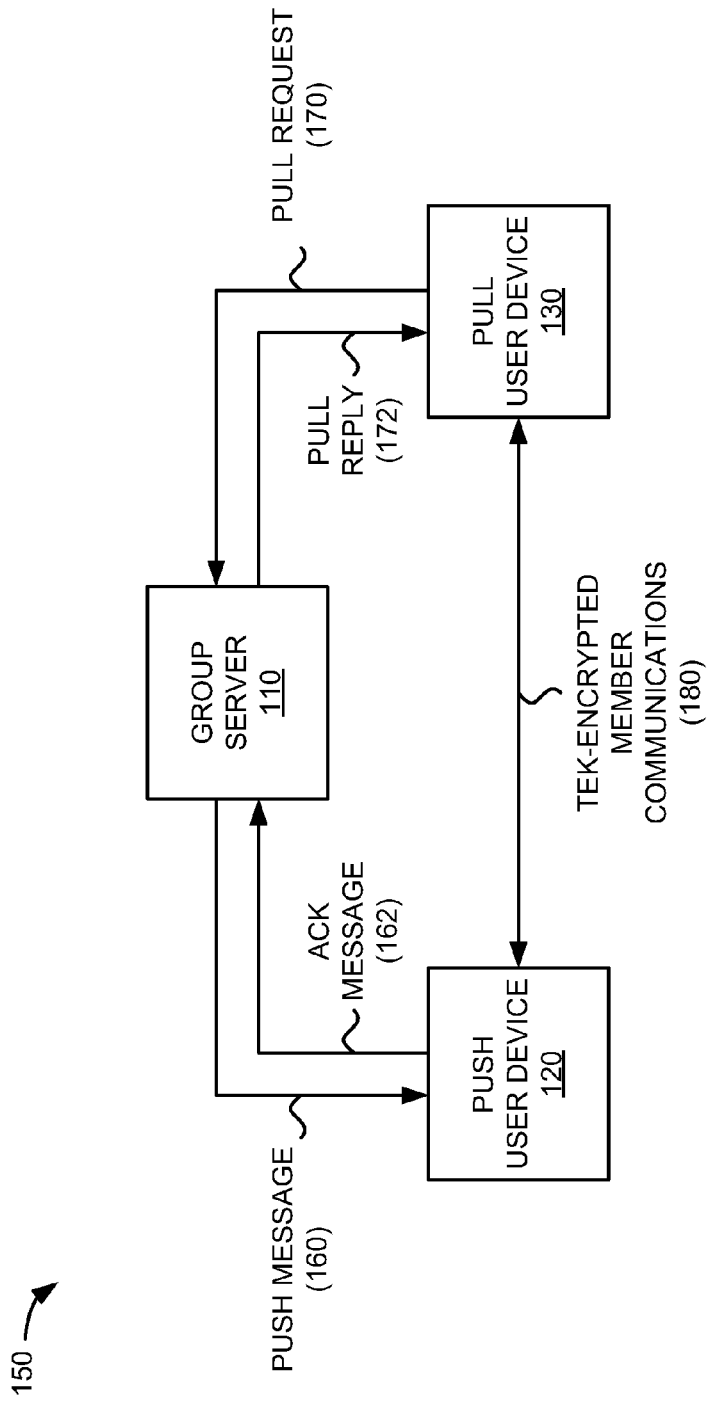

The following detailed description refers to the accompanying drawings. The same reference numbers in different drawings may identify the same or similar elements. Also, the following detailed description does not limit the invention.

Systems and/or methods described herein may provide a secure key synchronization mechanism for seamless key updates in a group VPN. The systems and/or methods may use a timing sequence among a group server and group VPN members to ensure that no traffic interruption occurs due to secure key updates and that no more than two secure keys are installed at any time on any of the group VPN members.

FIG. 1A is diagram of an example network 100 in which systems and methods described herein may be implemented. Network 100 may include one or group servers 110 (referred to herein generically and singularly as "group server 110"), one or more push user devices 120 (referred to herein generically and singularly as "push user device 120"), one or more pull user devices 130 (referred to herein generically and singularly as "pull user device 130") interconnected by a network 140. Group server(s) 110, push user device(s) 120, and pull user device(s) 130 may connect via wired and/or wireless connections. Group server(s) 110, push user device(s) 120, and pull user device(s) 130 may be connected within a group virtual private network (VPN) 150.

Group server 110 may include one or more server devices, or other types of computation or communication devices, that gather, process, search, store, and/or provide information in a manner similar to that described herein. For example, group server 110 may host an interface application that may be used to form a group VPN with push user devices 120 and/or pull user devices 130. Group server 110 may manage secure keys and policies for group VPN 150. Group server 110 may distribute the secure keys to push user devices 120 and pull user devices 130.

Push user device 120 may include any device that is capable of communicating with group server 110, another push user device 120, and/or pull user devices 130 via network 140. For example, push user device 120 may include a laptop computer, a personal computer, a set-top box (STB), a gaming system, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a cellular telephone, a smart phone, other types of mobile communication devices, a global positioning system (GPS) device, a content recording device (e.g., a camera, a video camera, etc.), a vehicular computing and/or communication device, etc. Push user device 120 may be capable of receiving push messages, such as a multicast push message or a unicast push message, that include new secure keys from group server 110. Push user device 120 may also be capable of implementing policies to manage synchronized activation and/or deletion of secure keys.

Pull user device 130 may include any device similar to that of push user device 120. However, pull user device 130 may not, at a particular point in time, be capable of receiving push messages, such as new secure keys, from group server 110. For example, pull user device 130 (or a portion of network 140 associated with pull user device 130) may not support delivery of a push message from group server 110. As another example, a push message from group server 110 may be lost and not received by pull user device 130. Pull user device 130 may be capable of implementing policies to manage synchronized activation and/or deletion of secure keys. Push user devices 120 and pull user devices 130 may be referred to herein collectively as "group VPN members 120/130."

Network 140 may include a local area network (LAN), a wide area network (WAN), a metropolitan area network (MAN), a telephone network, such as the Public Switched Telephone Network (PSTN) or a cellular network, the Internet, an intranet, other networks, or a combination of networks.

Group VPN 150 may include be implemented using security association protocols that use secure keys to permit communications among multiple group VPN members 120/130 and between group server 110 and multiple group VPN members 120/130. In one implementation, group VPN 150 may use the Group Domain of Interpretation (GDOI) protocol specified in IETF RFC 3547. To maintain a secure communications within group VPN 150, the secure keys may be changed (e.g., "re-keyed") at varying intervals. In implementations described herein, the re-keying sequence may be accomplished among group server 110 and group VPN members 120/130 without disruption to communications within group VPN 150.

FIG. 1B is a diagram of example communications among group server 110, push user device 120, and pull user device 130 of group VPN 150. As shown in FIG. 1B, group server 110 may provide secure keys to push user device 120 using a push message 160 (e.g., a multicast push message or unicast push messages to all members of group VPN 150). In the case of a unicast push message, push user device 120 may acknowledge receipt of push message 160 via an acknowledgment ("ACK") message 162. Members (e.g., pull user device 130) that do not receive push message 160 may initiate a pull request 170 to request a secure key. Group server 110 may provide the secure key to pull user device 130 in the form of a pull reply 172.

Group server 110 may distribute (e.g., via push message 160 or pull reply 172) two types of secure keys to push user device 120 and/or pull user device 130: a key encapsulation key (KEK) and a traffic encapsulation key (TEK). A KEK may be used to protect messages between group server 110 and the members. A TEK may be used to protect messages sent between any two members. A TEK may also be used to protect message multicast/broadcast from one members to many other members. If a KEK is not used, group server 110 cannot send any new KEK and TEK keys (secured by existing KEK) to the members when the existing ones expire. Group server 110 would then rely on the members to re-register before the old TEK keys expire.

For a particular key (KEK or TEK) distribution cycle, a push user device 120 may act as a pull user device 130 or a pull user device 130 may act as a push user device 120. Thus, in an implementation described herein, push user device 120 and pull user device 130 can be capable of implementing key distribution policies as either a pull member or a push member. Also, for any particular key distribution cycle, there may be only push user devices 120 or only pull user devices 130 within group VPN 150.

In implementations herein, a time-based secure key synchronization mechanism is provided for TEK re-keying. The group server 110 may create a new TEK, and push/send the new TEK to group VPN members 120/130. After a brief waiting period, group server 110 may remove the old TEK. Push user device 120 may receive the new TEK. Pull user device 130 may pull/re-register with group server 110 to get the new TEK if pull user device 130 does not receive the new TEK within a certain time before the existing TEK expires. Upon receipt, each group VPN member 120/130 may install the newly received TEK in the incoming direction (such that the TEK can be used to decrypt traffic encrypted with the new TEK). After a defined time interval (which may be different for push user devices 120 and pull user devices 130) each group VPN member 120/130 may activate the newly received TEK in the outgoing direction (such that the new TEK will be used to encrypt traffic that the group VPN member 120/130 sends to other members). After another defined time interval (which also may be different for push user devices 120 and pull user devices 130), group VPN members 120/130 may remove the old TEK key such that no group VPN member 120/130 will be required to maintain more than two TEKs at any time.

Although FIGS. 1A and 1B show example devices of network 100, in other implementations, network 100 may include fewer devices, different devices, differently arranged devices, and/or additional devices than those depicted in FIGS. 1A and 1B. Alternatively, or additionally, one or more devices of network 100 may perform one or more other tasks described as being performed by one or more other devices of network 100. For example, a device may function as both a group VPN member 120/130 and a group server 110.

FIG. 2 is a block diagram of an example device 200, which may correspond to one of group server 110, push user device 120, and/or pull user device 130. As shown, device 200 may include a bus 210, a processor 220, a main memory 230, a read only memory (ROM) 240, a storage device 250, an input device 260, an output device 270, and a communication interface 280. Bus 210 may include a path that permits communication among the elements of the device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

As will be described in detail below, device 200 may perform certain operations relating to time-based secure key synchronization. Network device 200 may perform these operations in response to processor 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as data storage device 250, or from another device via communication interface 280. The software instructions contained in main memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIG. 3 is a block diagram of example functional components of group server 110. In one implementation, the functions described in connection with FIG. 3 may be performed by one or more components of device 200 (FIG. 2). As illustrated, group server 110 may include a key generator 300 and a key distribution manager 310.

Key generator 300 may generate and provide secure keys (e.g., KEK and TEK keys) to group VPN members 120/130. Secure keys may include any type of content that may be used as a key. For example, key generator 300 may provide secure keys that include a sequence of random alpha-numeric characters. Secure keys may also include an expiration period.

Key distribution manager 310 may distribute new secure keys (such as new KEKs or TEKs) to enable uninterrupted subsequent communications from group server 110 to group VPN members 120/130 and/or between group VPN members 120/130. For example, key distribution manager 310 may initiate a TEK and/or KEK re-key sequence for group VPN 150, based on an upcoming expiration time for an existing TEK or KEK. For a TEK, the re-key sequence may be initiated, for example, at a time period (4*T) before the upcoming expiration time for the existing TEK; while for a KEK, the re-key sequence may be initiated, for example, at a time period (2*T) before the upcoming expiration time for the existing KEK. Key distribution manager 310 may retrieve, from key generator 300, a new secure key and send via a multicast push message the new secure key to group VPN members 120/130. When a pull member 130 cannot receive the multicast push message, key distribution manager 310 may receive a pull request, for the new secure key, from the pull member, and send the new secure key to pull member 130 via a point-to-point message. In one implementation, key distribution manager 310 may also distribute to each group VPN members 120/130 (e.g., as part of an initial group VPN registration), re-key sequencing instructions that include a duration for the time period T upon which re-keying sequences may be based.

Although FIG. 3 shows example functional components of group server 110, in other implementations, group server 110 may include fewer functional components, different functional components, differently arranged functional components, or additional functional components than depicted in FIG. 3. Alternatively, or additionally, one or more functional components of group server 110 may perform one or more other tasks described as being performed by one or more other components of group server 110.

Figure 4:
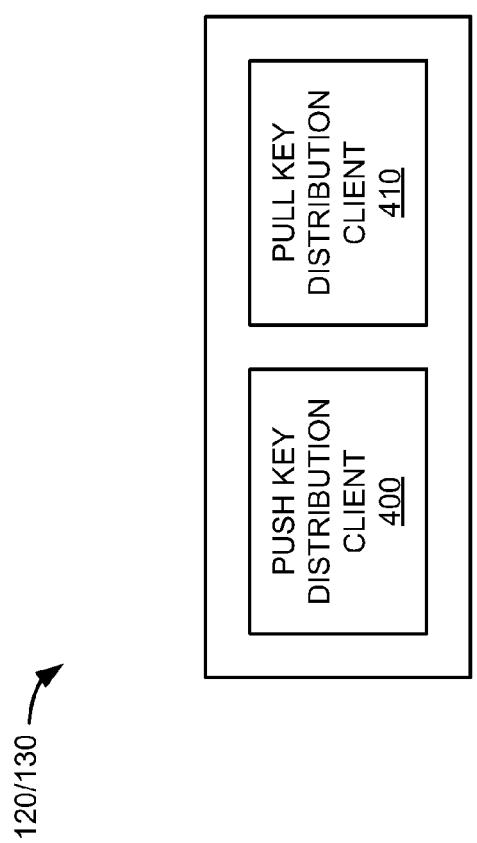
FIG. 4 is a block diagram of example functional components of a push user device or a pull user device of FIGS. 1A and/or 1B.

FIG. 4 is a block diagram of example functional components of a group VPN member 120/130. In one implementation, the functions described in connected with FIG. 4 may be performed by one or more components of device 200 (FIG. 2). As illustrated, group VPN member 120/130 may include a push key distribution client 400 and a pull key distribution client 410.

Push key distribution client 400 may manage re-key sequencing for a push user device 120. Upon receiving a multicast push message (e.g., from key distribution manager 310) with a new TEK, push key distribution client 400 may immediately install the new TEK as a backup TEK to decrypt incoming traffic. After a short wait period (e.g., 2*T after receiving the multicast push message), push key distribution client 400 may activate the new TEK as a primary TEK to encrypt outgoing traffic. After another short wait period (e.g., 3*T after receiving the multicast push message), push key distribution client 400 may delete the old TEK. Push key distribution client 400 may perform similar functions (although with different wait periods) for a multicast push message (e.g., from key distribution manager 310) that includes a new KEK.

Pull key distribution client 410 may manage re-key sequencing for pull user device 130. If a multicast push message with a new TEK is not received by a certain time period (e.g., 3*T) before the upcoming expiration time for the existing TEK, pull key distribution client 410 may send a pull request for the new TEK. Upon receiving the new TEK (e.g., from key distribution manager 310 via a point-to-point message), pull key distribution client 410 may install the new TEK as a backup TEK to decrypt incoming traffic. After a short wait period (e.g., 1*T after receiving the point-to-point message), pull key distribution client 410 may activate the new TEK as a primary TEK to encrypt outgoing traffic. After another short wait period (e.g., 2*T after receiving the point-to-point message), push key distribution client 400 may delete the old TEK.

Although FIG. 4 shows example functional components of group VPN member 120/130, in other implementations, group VPN member 120/130 may include fewer functional components, different functional components, differently arranged functional components, or additional functional components than depicted in FIG. 4. Alternatively, or additionally, one or more functional components of group VPN member 120/130 may perform one or more other tasks described as being performed by one or more other components of group VPN member 120/130.

Figure 5:
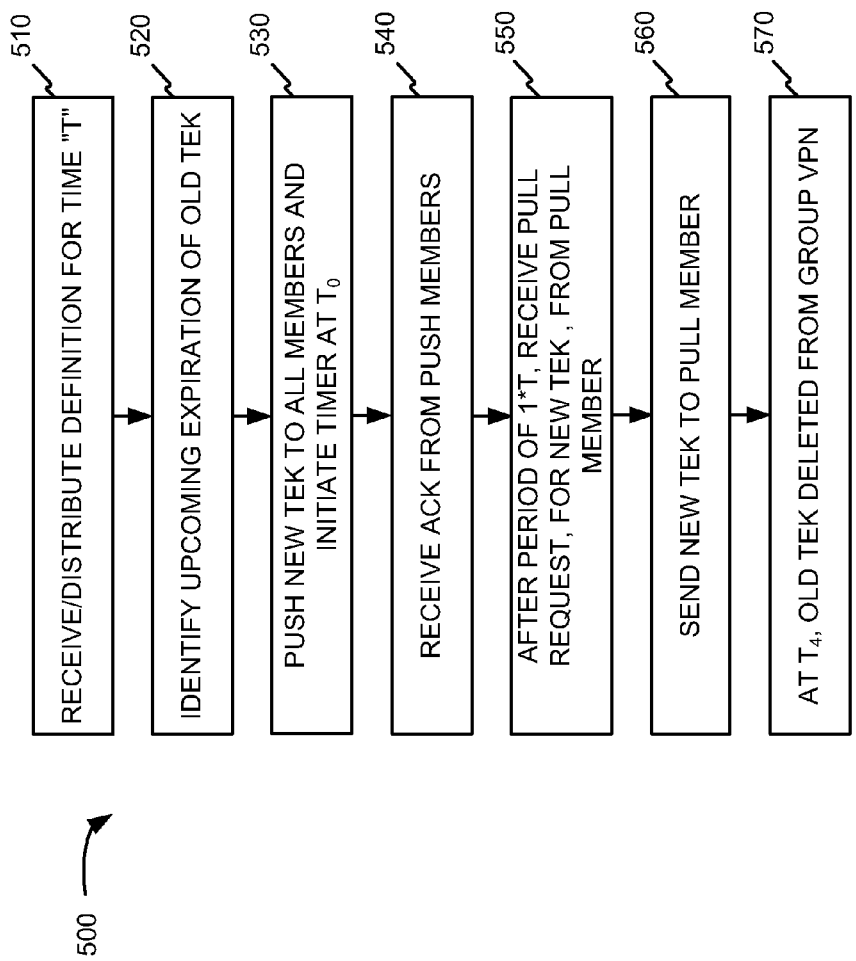
FIG. 5 is a flow diagram illustrating an example process for providing traffic encapsulation key (TEK) synchronization, according to an implementation described herein.

FIG. 5 is a flow diagram illustrating an example process 500 for providing secure TEK synchronization according to an implementation described herein. In one implementation, process 500 may be performed by group server 110. In another implementation, process 500 may be performed by another device or group of devices including or excluding group server 110.

Process 500 may include receiving and distributing a definition for a time period, T (block 510). For example, group server 110 may receive a value of T from a network administrator. T may represent a configurable time period for a given network (e.g., network 100). More particularly, T may represent a maximum round trip time for an exchange of a message between group server 110 and one of group VPN members 120/130. For example, in the context of an outgoing message from a group VPN member 120/130, T may represent the maximum time to perform all of the following: (1) generate and send a message from one of group VPN members 120/130 to group server 110; (2) process the message and/or replied to the message by group server 110; (3) process the reply by group VPN member 120/130; and (4) perform retransmissions. As another example, in the context of an outgoing message from group server 110, T may represent the maximum time to perform all of the following: (1) generate and send a message from group server 110 to one of group VPN members 120/130; (2) process the message and/or replied to the message by the group VPN member 120/130; (3) process the reply by group server 110; and (4) perform retransmissions. The value of T may be sent from group server 110 to each of group VPN members 120/130.

Still referring to block 510, the value of T may also account for retransmissions. In addition, T may include time for additional processing delay and transmission delay between group server 110 and group VPN members 120/130, and between group VPN members 120/130. This additional time may account for a time shift between re-keying sequence activities performed by group server 110 and group VPN members 120/130. The value of T may be empirically determined based on, for example, route pings, other test messages, or network statistics. In another implementation, the value for T may be automatically determined by group server 110 or another device (not shown) that provides the value of T to group server 110. Group server 110 may provide the value of T to group VPN members 120/130 during, for example, a VPN registration process.

Process 500 may include identifying an upcoming expiration of an old TEK (block 520), and pushing a new TEK to all group VPN members and initiating a timer at 0*T (block 530). For example, group server 110 (e.g., key distribution manager 310) may monitor an expiration time for a current (e.g., old) TEK and determine that an updated (e.g., new) TEK will be required by group VPN members 120/130. In one implementation, the timing for sending the new TEK may be based on a time period (4*T) prior to the expiration time for the old TEK. Key distribution manager 310 may retrieve, from key generator 300, a new TEK and send the new TEK as a multicast push message (e.g., push message 160) to all group VPN members 120/130 (although only push user devices 120 may actually receive the push message). Key distribution manager 310 may initiate a timer (e.g., at time 0 or 0*T) to assist in synchronization.

An acknowledgment from the push members may be received (block 540). For example, in the case of a unicast push message, key distribution manager 310 may receive, from each push user device 120, an acknowledgment message (e.g., ACK message 162), within no more than 1*T from the time the TEK push message (e.g., push message 160) is sent. If the TEK is pushed to group VPN members 120/130 (e.g., push message 160 is a multicast push message), acknowledge may not be needed or implemented.

After a time (1*T), a pull request, for a new TEK, from a pull member may be received (block 550). For example, key distribution manager 310 may receive a pull request (e.g., pull request 170) from a pull user device 130. The pull request may be in the form a re-registration request for the group VPN.

The new TEK may be sent to the pull member (block 560). For example, key distribution manager 310 may retrieve, from key generator 300, the new TEK and send the new TEK as point-to-point message (e.g., pull reply 172) to all group VPN members 120/130 requesting the new TEK.

At a time (4*T), the old TEK may be deleted from the group VPN (block 570). For example, by 4*T, all of push user devices 120 and pull user devices 130 will have locally deleted the old TEK. At 4*T, which may correspond to the expiration time of the old TEK, key distribution manager 310 may also delete the old TEK from group server 110 (e.g., key generator 300).

Figure 6:
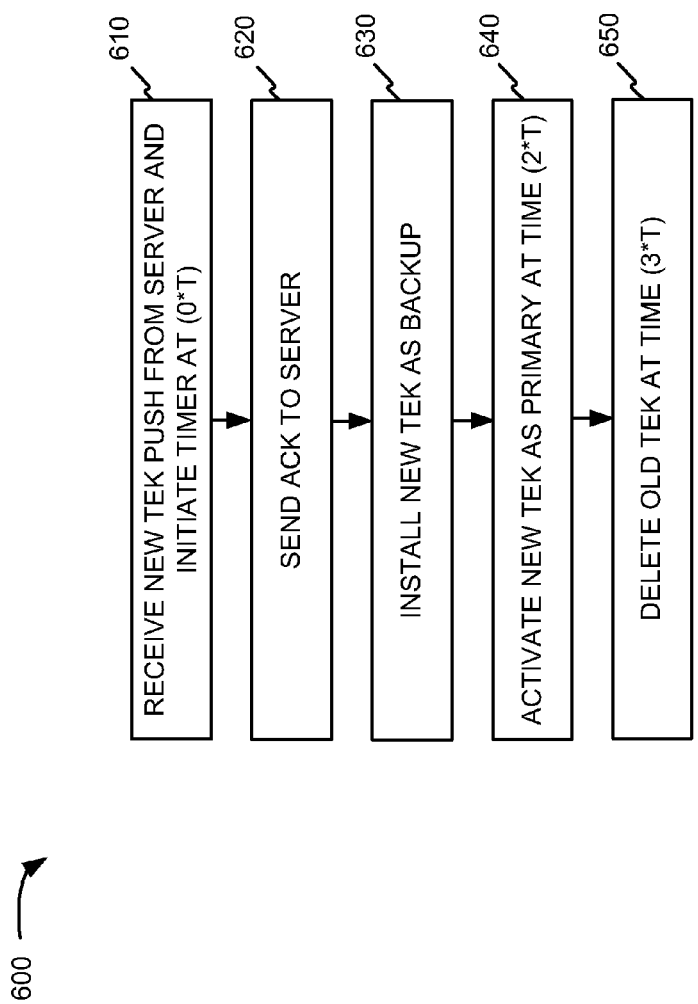
FIG. 6 is a flow diagram illustrating an example process for providing TEK synchronization, according to another implementation described herein.

FIG. 6 is a flow diagram illustrating an example process 600 for providing TEK synchronization according to another implementation described herein. In one implementation, process 600 may be performed by push user device 120. In another implementation, process 600 may be performed by another device or group of devices including or excluding push user device 120.

Process 600 may include receiving a new TEK push message from a group VPN server and initiating a timer at 0*T (block 610). For example, push user device 120 (e.g., push key distribution client 400) may receive a new TEK as push message (e.g., push message 160) to all group VPN members 120/130 (although only push user devices 120 may actually receive the push message). Key distribution client 400 may initiate a timer (e.g., at time 0 or 0*T, based on the receipt time of push message 160) to assist in ongoing TEK synchronization.

An acknowledgment may be sent to the group VPN server (block 620) and the new TEK may be installed as a backup (block 630). For example, in the case where push message 160 is a unicast push message, push key distribution client 400 may send an acknowledgment message (e.g., ACK message 162) to group server 110 based on receipt of the push message. Regardless of whether push message 160 is a multicast or unicast message, key distribution client 400 may install the new TEK as a backup (e.g., to decrypt any incoming traffic that may be encrypted with the new TEK before push user device 120 activates the new TEK as the primary TEK). Thus, for a certain time period, push user device 120 may have decryption capabilities using both the old TEK and the new TEK.

At time (2*T), the new TEK may be activated as the primary TEK (block 640). For example, push key distribution client 400 may activate the new TEK as the primary TEK after a 2*T delay interval. The new TEK may be used to encrypt traffic that push user device 120 sends to other group VPN members 120/130. Waiting for a period of 1*T would be enough time for all push members (e.g., all push user devices 120) to receive the new TEK. However, as described further herein, additional time may be required to synchronize with pull members (e.g., pull user devices 130), since pull user device 130 would not be guaranteed to receive the new TEK before an interval of 2*T.

At time (3*T), the old TEK may be deleted (block 650). For example, push key distribution client 400 may delete the old TEK after waiting an interval of 1*T more from the time the new TEK is activated. The additional 1*T delay before deleting the old key may ensure that push user device 120 could use the old TEK to decrypt traffic that has been encrypted using the old TEK before all other group VPN members 120/130 activate the new TEK.

Figure 7:
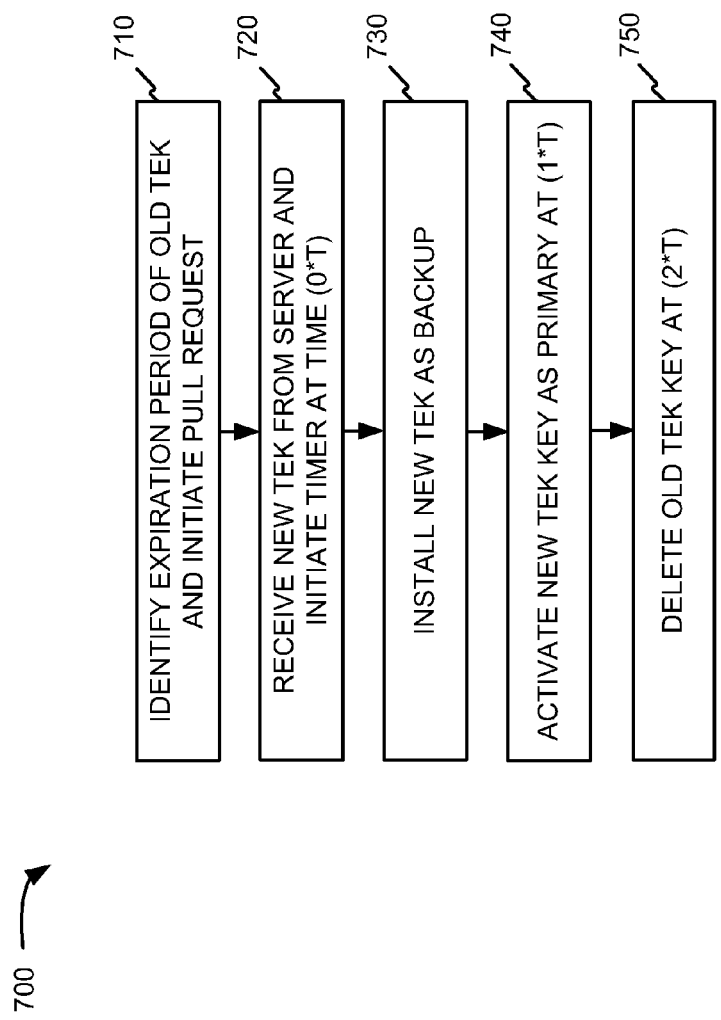
FIG. 7 is a flow diagram illustrating an example process for providing TEK synchronization, according to still another implementation described herein.

FIG. 7 is a flow diagram illustrating example process 700 for providing TEK synchronization according to still another implementation described herein. In one implementation, process 700 may be performed by pull user device 130. In another implementation, process 700 may be performed by another device or group of devices including or excluding pull user device 130.

Process 700 may include identifying an expiration time of an old TEK and initiating a pull request (block 710). For example, pull user device 130 (e.g., pull key distribution client 410) may monitor an expiration time for a current (e.g., old) TEK and determine that an updated (e.g., new) TEK will be required. In one implementation, the timing for requesting the new TEK may be based on 3*T prior to the expiration time for the old TEK. When pull user device 130 fails to receive a new TEK at 3*T before the expiration time of the current TEK (as result of, for example, push message 160 not being received at 4*T before the expiration time of the current TEK), pull key distribution client 410 may initiate a pull request (e.g., pull request 170) to re-register with group server 110.

Process 700 may include receiving a new TEK from the group VPN server and initiating a timer at time (0*T) (block 720). For example, pull user device 130 (e.g., pull key distribution client 410) may receive a new TEK as point-to-point reply message (e.g., pull reply 172) from group server 110. Pull key distribution client 410 may initiate a timer (e.g., at 0 or 0*T) to assist in ongoing TEK synchronization.

The new TEK may be installed as a backup (block 730). For example, pull user device 130 (e.g., pull key distribution client 410) may install the new TEK as a backup (e.g., to decrypt any incoming traffic that may be encrypted with the new TEK before pull user device 130 activates the new TEK as the primary TEK). Thus, for a certain period, pull user device 130 may have decryption capabilities using both the old TEK and the new TEK.

At time (1*T), the new TEK may be activated as the primary TEK (block 740). For example, pull user device 130 (e.g., pull key distribution client 410) may activate the new TEK as the primary TEK after a 1*T delay interval. The new TEK may be used to encrypt traffic that pull user device 130 sends to other group VPN members 120/130.

At time (2*T), the old TEK may be deleted (block 750). For example, pull user device 130 (e.g., pull key distribution client 410) may delete the old TEK after waiting 1*T more from the time the new TEK is activated on pull user device 130. The additional 1*T delay before deleting the old key may ensure that pull user device 130 could use the old TEK to decrypt traffic that has been encrypted using the old TEK during the previous time period (e.g., the period between 2*T and 3*T from when group server 110 initiates the new TEK distribution via push message 160).

Figure 8:
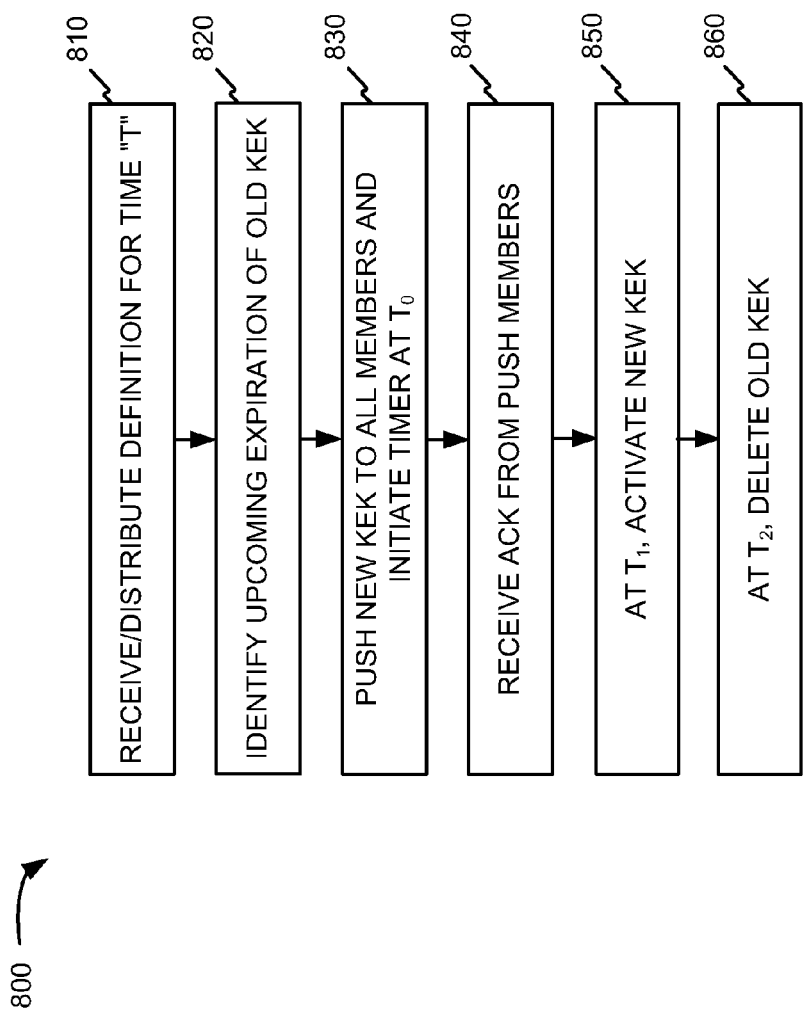
FIG. 8 is a flow diagram illustrating an example process for providing key encapsulation key (KEK) synchronization, according to an implementation described herein.

FIG. 8 is a flow diagram illustrating an example process 800 for providing KEK synchronization according to an implementation described herein. In one implementation, process 800 may be performed by a group server 110. In another implementation, process 800 may be performed by another device or group of devices including or excluding group server 110.

Process 800 may include receiving a definition for a time period, T (block 810). For example, as described above in connection with FIG. 5, group server 110 may receive a value of T from a network administrator. T may represent a configurable time period for a given network (e.g., network 100). The value of T in process 800 may be consistent with the value of T used for the processes in FIGS. 5-7.

Process 800 may include identifying an upcoming expiration of an old KEK (block 820), and pushing a new KEK to all group VPN members and initiating a timer at time $T_0$ (block 830). For example, group server 110 (e.g., key distribution manager 310) may monitor an expiration time for a current (e.g., old) KEK and determine that an updated (e.g., new) KEK will be required for group server 110 and group VPN members 120/130. In one implementation, the timing for sending the new TEK may be based on 2*T prior to the expiration time for the old TEK. Key distribution manager 310 may retrieve, from key generator 300, a new KEK and send the new KEK as multicast push message (e.g., push message 160) to all group VPN members 120/130 (although only push user devices 120 may actually receive the push message). Key distribution manager 310 may initiate a timer (e.g., at 0 or 0*T) to assist in synchronization.

An acknowledgment from the push members may be received (block 840). For example, key distribution manager 310 may receive, from each push user device 120, an acknowledgment message (e.g., ACK message 162), within no more than 1*T from the time the KEK push message (e.g., push message 160) is sent. In other implementations (e.g., when push message 160 is a multicast push message), an acknowledgement message may not be required.

After time $T_1$, the new KEK may be activated as the primary KEK (block 850). For example, key distribution manager 310 may activate the new KEK as the primary KEK after a 1*T delay interval. The new TEK may be used to encrypt traffic that group server 110 sends to group VPN members 120/130. Waiting for a period of 1*T can provide enough time for all push members (e.g., all push user devices 120) to receive the new KEK. No additional time may be required to synchronize with pull members (e.g., pull user devices 130), since pull user devices 130 would not be able to receive KEK push messages.

After time $T_2$, the old KEK may be deleted (block 860). For example, at 2*T, key distribution manager 310 may delete the old KEK from group server 110.

Figure 9:
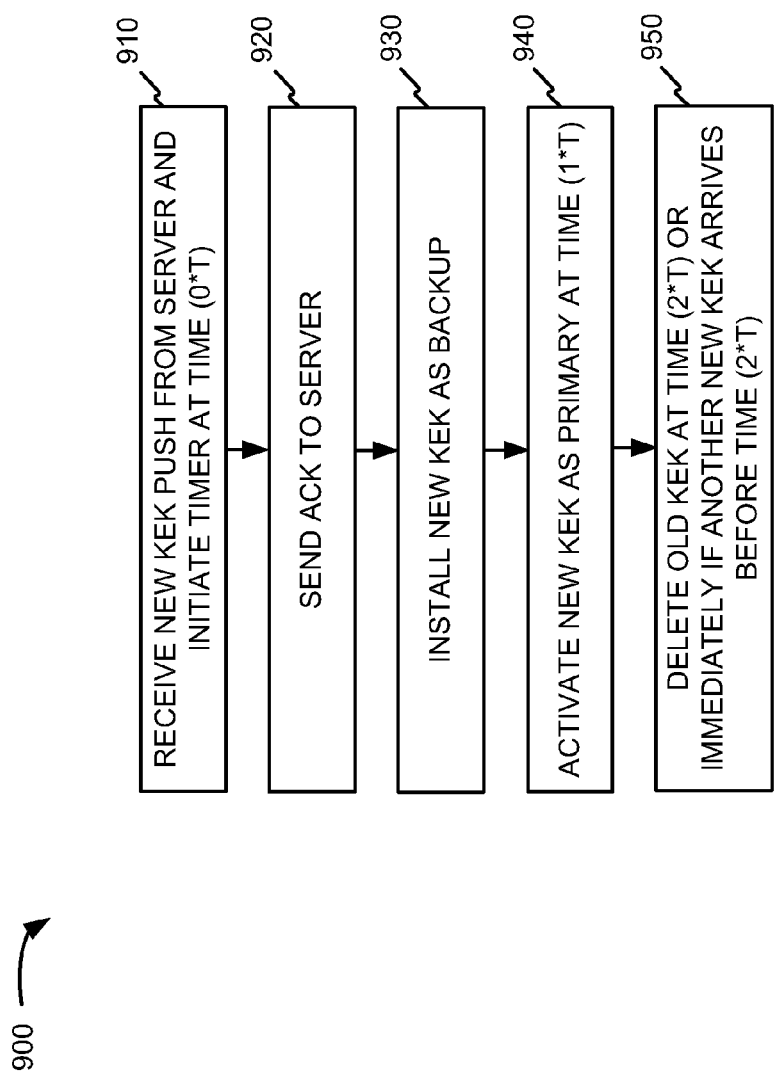
FIG. 9 is a flow diagram illustrating an example process for providing KEK synchronization, according to another implementation described herein.

FIG. 9 is a flow diagram illustrating an example process 900 for providing KEK synchronization according to another implementation described herein. In one implementation, process 900 may be performed by push user device 120. In another implementation, process 900 may be performed by another device or group of devices including or excluding push user device 120.

Process 900 may include receiving a new KEK push message from a group VPN server and initiating a timer at time (0*T) (block 910). For example, push user device 120 (e.g., push key distribution client 400) may receive a new KEK as a multicast push message (e.g., push message 160) to all group VPN members 120/130 (although only push user devices 120 may actually receive the push message). Push key distribution client 400 may initiate a timer (e.g., at 0 or 0*T) to assist in ongoing KEK synchronization.

An acknowledgment may be sent to the group VPN server (block 920) and the new KEK may be installed as a backup (block 930). For example, push key distribution client 400 may send an acknowledgment message (e.g., ACK message 162) to group server 110 based on receipt of the KEK multicast push message (e.g., push message 160). Push key distribution client 400 may install the new KEK as a backup (e.g., to decrypt any incoming traffic that may be encrypted with the new KEK before push user device 120 activates the new KEK as the primary KEK). Thus, for a certain period, push user device 120 may have decryption capabilities using both the old KEK and the new KEK.

At time (1*T), the new KEK may be activated as the primary KEK (block 940). For example, push key distribution client 400 may activate the new KEK as the primary KEK after a 1*T delay interval. The new KEK may be used to encrypt traffic that push user device 120 sends to group server 110.

The old TEK may be deleted at time (2*T) or immediately if another new KEK arrives before time (2*T) (block 950). For example, push user device 120 (e.g., push key distribution client 400) may delete the old KEK after waiting 1*T more from the time the new KEK is activated. The additional 1*T delay before deleting the old KEK may ensure that push user device 120 could use the old KEK to decrypt traffic that has been encrypted using the old KEK before the hard lifetime of the old KEK expires (e.g., at 2*T from when group server 110 initiates the new KEK distribution via push message 160). However, if another new KEK key is received from group server 110, push user device 120 may immediately delete the oldest KEK so that only two KEKs are stored with push user device 120 at any time.

Figure 10:
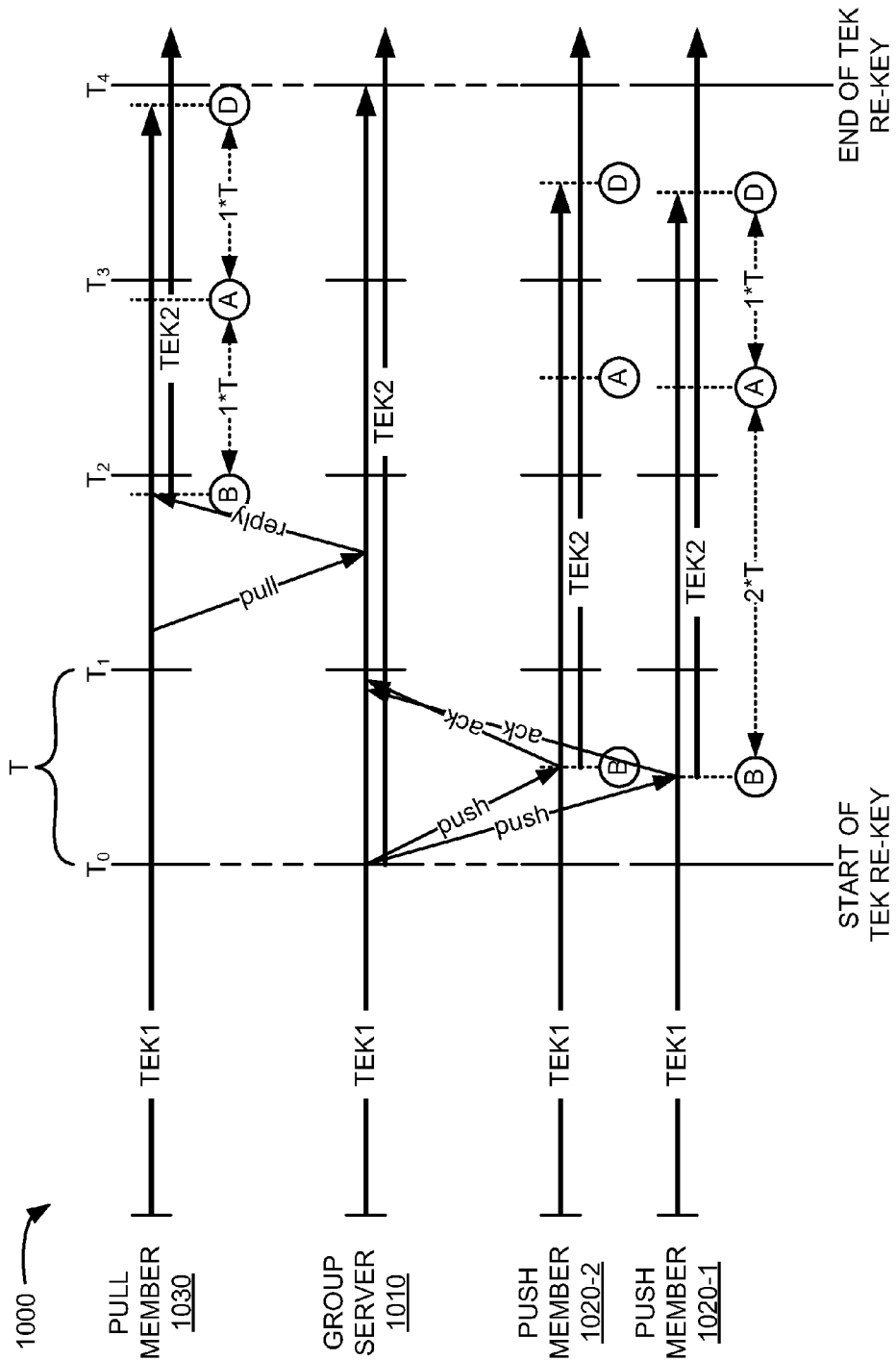
FIG. 10 is a flow diagram illustrating an implementation of a TEK synchronization sequence.

FIG. 10 provides a flow diagram 1000 illustrating an implementation of a TEK synchronization sequence using the systems and/or methods described herein. Assume a group VPN includes a group server 1010, push members 1020-1 and 1020-2, and a pull member 1030. Also, assume an existing (e.g., old) TEK key, "TEK1" is in effect for the group VPN prior to time $T_0$. At time $T_0$ (e.g., 4*T before the expiration of TEK1), group server 1010 may generate a new TEK key ("TEK2"), and push TEK2 down to all group members (e.g., push members 1020-1 and 1020-2 and pull member 1030, although only the push members will receive TEK2). Push members 1020-1 and 1020-2 may receive and (in the case of a unicast push message) acknowledge TEK2 by time $T_1$.

Once push members 1020-1 and 1020-2 receive TEK2, each of push members 1020-1 and 1020-2 can install TEK2 as a backup for decryption (in addition to the existing key TEK1), as indicated by reference "B." Each of push members 1020-1 and 1020-2 wait for a time period of 2*T, and then can activate TEK2, as indicated by reference "A." At activation, TEK2 may be used as the primary key to encrypt traffic that push members 1020-1 and 1020-2 send to other members. Waiting for a time period of 1*T would be enough for both of push members 1020-1 and 1020-2 to receive the new TEK2 key. However, to sync up with pull member 130, push members 1020-1 and 1020-2 can wait an additional time period. Once TEK2 is activated (at "A"), each of push members 1020-1 and 1020-2 can wait for another time period of 1*T before each will remove the old TEK1, as indicated by reference "D".

When pull member 1030 does not receive TEK2 by time $T_1$ (e.g., 3*T before the expiration of TEK1), pull member 1030 can re-register with group server 110 to get TEK2. It should be noted that $T_0$, $T_1$, $T_2$, $T_3$ and $T_4$ are based on group server 1010's view of time. In practice, pull member 1030 may start its registration slightly after time $T_1$ due to network time skew. Once pull member 1030 receives TEK2, as indicated by reference "B," pull member 1030 may delay for a time period of 1*T. After that, pull member 1030 can activate the new key, as indicated by reference "A." After another T time, pull member 1030 may remove the old key, TEK1, as indicated by reference "D."

With the design outlined above, by time $T_2$, all of push members 1020-1 and 1020-2 and pull member 1030 will have installed the new TEK key (TEK2). Between times $T_2$ and $T_3$, all of the members (e.g., push members 1020-1 and 1020-2 and pull member 1030) are clear to activate the new key TEK2 without concern of traffic interruption, as their peer members have installed the new key for decryption by time $T_2$. By time $T_3$, all members will have activated the new key TEK2. Between times $T_3$ and $T_4$, all of members are clear to remove the old TEK1, as their peer members have activated the new key TEK2 for encryption by time $T_3$. By time $T_4$, all members will have removed the old key TEK1 (as indicated by references "D").

From the server perspective, all members must have removed the old TEK (TEK1) by time $T_4$, leaving only one TEK left on each of push members 1020-1 and 1020-2 and pull member 1030 after time $T_4$. If there is any pending rekey request that is triggered (e.g. by a configuration change) between $T_0$ and $T_4$, group server 1010 may hold the request while the current TEK rekey is being conducted. At $T_4$, group server 1010 could start another rekey sequence.

As can be seen in FIG. 10, the TEK rekey synchronization mechanism, according to an implementation herein, may provide a smooth TEK transition without service interruption for group VPN members. Both push members and pull members can co-exist in the group VPN, and, at most, two TEKs are installed at any time on each of the group VPN members.

Figure 11:
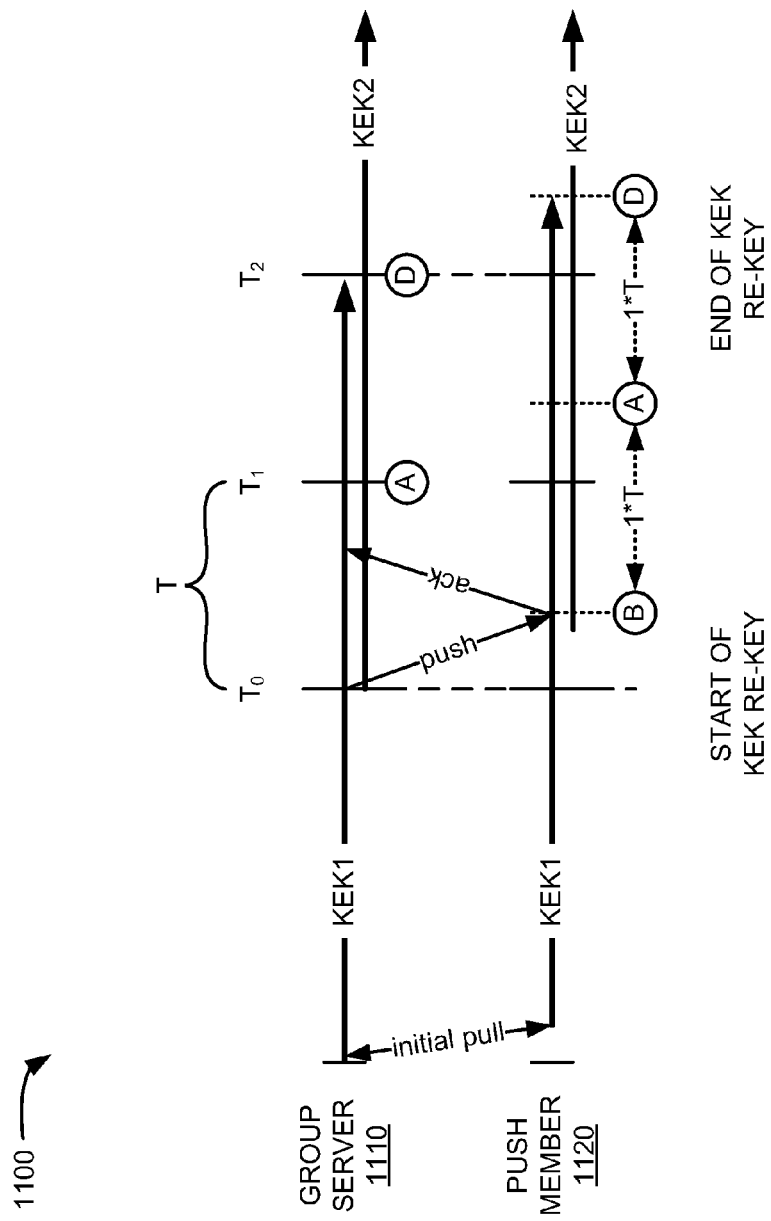
FIG. 11 is a flow diagram illustrating an implementation of a KEK synchronization sequence.

FIG. 11 provides a flow diagram 1100 illustrating an implementation of a TEK synchronization sequence using the systems and/or methods described herein. Assume a group VPN includes a group server 1110 and a push member 1120. Also, assume an existing (e.g., old) KEK key, "KEK1," is in effect for the group VPN prior to time $T_0$. At time $T_0$ (e.g., 2*T before the expiration of KEK1), group server 1110 may generate a new KEK key ("KEK2"), and push KEK2 down to all group members (e.g., push member 1120). Group server 1110 may activate KEK2 at time $T_1$, as indicated by reference "A." Group server 1110 may delete KEK1 at time $T_2$, as indicated by reference "D," so that any replies from push member 1120 still using KEK1 can be decrypted.

Push member 1120 may receive and (in the case of a unicast push message) acknowledge KEK2 by time $T_1$. Once push member 1120 receives KEK2, push member 1120 can install KEK2 as a backup for decryption (in addition to the existing key KEK1), as indicated by reference "B." Push member 1120 may wait for a time period of 1*T, and then can activate KEK2, as indicated by reference "A." At activation, KEK2 may be used as the primary key to encrypt traffic that is sent to group server 1110. Push member 1120 may also choose to use the same KEK key (used in decrypting the request from group server 1110) in encrypting a corresponding reply/ack to group server 1110. While group server 1110 is conducting a KEK rekey, if there is another KEK rekey request (e.g., due to configuration change), that request may be delayed until $T_2$ (e.g., when the current rekey to KEK2 is completed).

As can be seen in FIG. 11, the KEK rekey synchronization mechanism, according to an implementation herein, may provide a smooth KEK transition without service interruption for group VPN members. At most, two KEKs are installed at any time on each of the group VPN members.

While the examples of FIGS. 10 and 11 employ the use of acknowledgement ("ack") messages, in network with many members, the use of multicast push message without acknowledgement may be preferred to improve scalability and performance of the key synchronization system. In the case where acknowledgement messages are not used, multicast push message may be sent multiple times (e.g., a configurable number of times within a period T) to increase the chance of push members receiving the push message. If a push member misses the push message after the multiple times, the push member may eventually act as a pull member and send a message to the server to request a new TEK or KEK.

In the systems and/or methods described herein, a secure key synchronization mechanism may be implemented to provide seamless key update in a group VPN. The systems and/or methods may use a timing sequence among a group server, push members, and pull members to ensure that no traffic interruption occurs due to secure key updates and that no more than two secure keys are installed at any time on any of the group VPN members.

The foregoing description of example implementations provides illustration and description, but is not intended to be exhaustive or to limit the invention to the precise form disclosed. Modifications and variations are possible in light of the above teachings or may be acquired from practice of the invention.

For example, while series of blocks have been described with respect to FIGS. 5-9, the order of the blocks may be varied in other implementations. Moreover, non-dependent blocks may be implemented in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as a "component" that performs one or more functions. This component may include hardware, such as a processor, microprocessor, an application specific integrated circuit, or a field programmable gate array; or a combination of hardware and software.

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
    determining, by a server device, a particular amount of time;
    sending, by the server device, information identifying the particular amount of time to members of a group virtual private network (VPN) during a VPN registration process,
        the particular amount of time being based on a round trip time for an exchange of a message between the server device and one of the members of the group VPN;
    identifying, by the server device, an expiration time of a first traffic encapsulation key (TEK);
    sending, by the server device, a second TEK to the members of the group VPN based on the particular amount of time and the expiration time of the first TEK;
    receiving, by the server device, a request, from a particular member of the members of the group VPN, that is sent by the particular member based on the particular amount of time; and
    sending, by the server device and to the particular member, the second TEK as a response to the request,
        the members of the group VPN transitioning from the first TEK to the second TEK before the expiration time of the first TEK.

2. The method of claim 1, where sending the second TEK to the members of the group VPN occurs at a time that is 4 times the particular amount of time before the expiration time of the first TEK.

3. The method of claim 1, further comprising:
    deleting, at the expiration time, the first TEK.

4. The method of claim 1, where sending the second TEK to the particular member includes:
    sending the second TEK to the particular member via a point-to-point message.

5. The method of claim 1, where the particular member includes a pull user device that is not capable of receiving a push message from the server device.

6. The method of claim 1, where the expiration time of the first TEK is based on a clock of the server device.

7. The method of claim 1, further comprising:
    causing the members of the group VPN to:
        install the second TEK as a backup TEK to decrypt incoming traffic, activate, by the members and at a time that is 2 times the particular amount of time after receiving the second TEK, the second TEK as a primary TEK to encrypt outgoing traffic, and delete, by the members and at a time that is 3 times the particular amount of time after receiving the second TEK, the first TEK.

8. The method of claim 7, further comprising:

causing the particular member to:

install, by the particular member and upon receiving the second TEK in a point-to-point reply as the response to the request, the second TEK as a backup TEK to decrypt incoming traffic, activate, by the particular member and at a time that is 1 times the particular amount of time after receiving the point-to-point reply, the second TEK as a primary TEK to encrypt outgoing traffic, and delete, by the particular member and at a time that is 2 times the particular amount of time after receiving the point-to-point reply, the first TEK.

9. The method of claim 8, further comprising:

causing the particular member to:

initiate, by the particular member, the request of the second TEK if the second TEK is not received, by the particular member, within a time period that is 3 times the particular amount of time before the expiration time of the first TEK.

10. The method of claim 1, where the server device stores no more than two TEKs at any time, and where each of the members of the group VPN stores no more than two TEKs at any time.

11. The method of claim 1, further comprising:

initiating a key encapsulation key (KEK) re-key sequence for the group VPN based on an expiration time for a first KEK;

sending, during a first time period T after initiating the KEK re-key sequence, a second KEK to the members of the group VPN;

activating, at a time that is 1 times the particular amount of time after sending the second KEK, the second KEK as a primary TEK to encrypt outgoing traffic; and deleting, at a time that is 2 times the particular amount of time after sending the second KEK, the first KEK.

12. The method of claim 11, where the KEK re-key sequence transitions all the members of the group VPN from the first KEK to the second KEK before the expiration time of the first KEK.

13. The method of claim 11, where initiating the KEK re-key sequence occurs at a time that is 2 times the particular amount of time before the expiration time of the first KEK.

14. A device comprising:

a memory; and a processor to:

determine a particular amount of time;

send information identifying the particular amount of time to member devices of a group virtual private network (VPN) during a VPN registration process, the particular amount of time being based on a round trip time for an exchange of a message between the device and one of the member devices of the group VPN;

identify an expiration time for a first traffic encapsulation key (TEK);

send a second TEK to the member devices of the group VPN based on the particular amount of time and the expiration time of the first TEK;

receive a request, from a particular member device of the member devices of the group VPN, that is sent by the particular member device based on the particular amount of time; and send, to the particular member device, the second TEK as a response to the request, the member devices of the group VPN transitioning from the first TEK to the second TEK before the expiration time of the first TEK.

15. The device of claim 14, where the processor is further to:

send, to the member devices of the group VPN, instructions to:

install the second TEK as a backup TEK, activate, at a time that is 2 times the particular amount of time after receiving the second TEK, the second TEK as a primary TEK, and delete, at a time that is 3 times the particular amount of time after receiving the second TEK, the first TEK.

16. The device of claim 14, where each of the member devices stores no more than two TEKs at any time.

17. The device of claim 14, where the round trip time for the exchange of the message includes one or more of:

a time for the one of the member devices to generate the message, a time for the one of the member devices to send the message to the device, a time for the device to provide a reply to the message to the one of the member devices, or a time for the one of the member devices to process the reply to the message.

18. A non-transitory computer-readable medium storing instructions, the instructions comprising:

one or more instructions that, when executed by at least one processor of a server, cause the at least one processor to:

determine a particular amount of time;

send information identifying the particular amount of time to a plurality of members of a group virtual private network (VPN) during a VPN registration process, the particular amount of time being based on a round trip time for an exchange of a message between the server and one of the plurality of members of the group VPN;

identify an expiration time for a first traffic encapsulation key (TEK);

send a second TEK to the plurality of members of the group VPN based on the particular amount of time and the expiration time of the first TEK;

receive a request, from a particular member of the plurality of members of the group VPN, that is sent by the particular member based on the particular amount of time; and send, based on the request and to the particular member, the second TEK, the plurality of members of the group VPN transitioning from the first TEK to the second TEK before the expiration time of the first TEK.

19. The non-transitory computer-readable medium of claim 18, where the instructions further comprise:

one or more instructions that, when executed by the at least one processor, cause the at least one processor to:

initiate a key encapsulation key (KEK) re-key sequence for the group VPN based on an expiration time for a first KEK;

send a second KEK to the plurality of members of the group VPN based on the expiration time of the first KEK and the particular amount of time;

activate, at a time that is 1 times the particular amount of time after sending the second KEK, the second KEK to encrypt outgoing traffic; and delete, at a time that is 2 times the particular amount of time after sending the second KEK, the first KEK.

20. The non-transitory computer-readable medium of claim 18, where the particular member is incapable of receiving a push message that includes the first TEK from the server that includes the at least one processor.

21. The non-transitory computer-readable medium of claim 18, where the instructions further comprise:
one or more instructions that, when executed by the at least one processor, cause the at least one processor to:
delete the first TEK at a time based on the particular amount of time.

22. A non-transitory computer-readable medium storing instructions, the instructions comprising:
one or more instructions that, when executed by at least one processor, cause the at least one processor to:
determine a particular amount of time;
send information identifying the particular amount of time to members of a group virtual private network (VPN) during a VPN registration process,
the particular amount of time being based on a round trip time for an exchange of a message between a group server and one of the members of the group VPN;
identify an expiration time for a first key encapsulation key (KEK);

send a second KEK to the members of the group VPN based on the particular amount of time and the expiration time of the first KEK;

activate, at a time that is 1 times the particular amount of time after sending the second KEK, the second KEK to encrypt outgoing traffic; and delete, at a time that is 2 times the particular amount of time after sending the second KEK, the second KEK.

23. The non-transitory computer-readable medium of claim 22, where the instructions further comprise:
one or more instructions that, when executed by the at least one processor, cause the at least one processor to:
initiate a KEK re-key sequence at a time that is 2 times the particular amount of time before the expiration time of the first KEK.

24. The non-transitory computer-readable medium of claim 22, where the round trip time for the exchange of the message includes one or more of:
a time for the group server to generate the message,
a time for the group server to send the message to the one of the members,
a time for the one of the members to provide a reply to the message to the one of members, or
a time for the group server to process the reply to the message.

25. The non-transitory computer-readable medium of claim 22, where the round trip time for the exchange of the message includes one or more of:
a time for retransmissions,
a time for processing delay, or
a time for transmission delay.

\* \* \* \* \*